(No Model.)
A. BOSCH.
PRUNING IMPLEMENT.
No. 379,359. Patented Mar. 13, 1888.
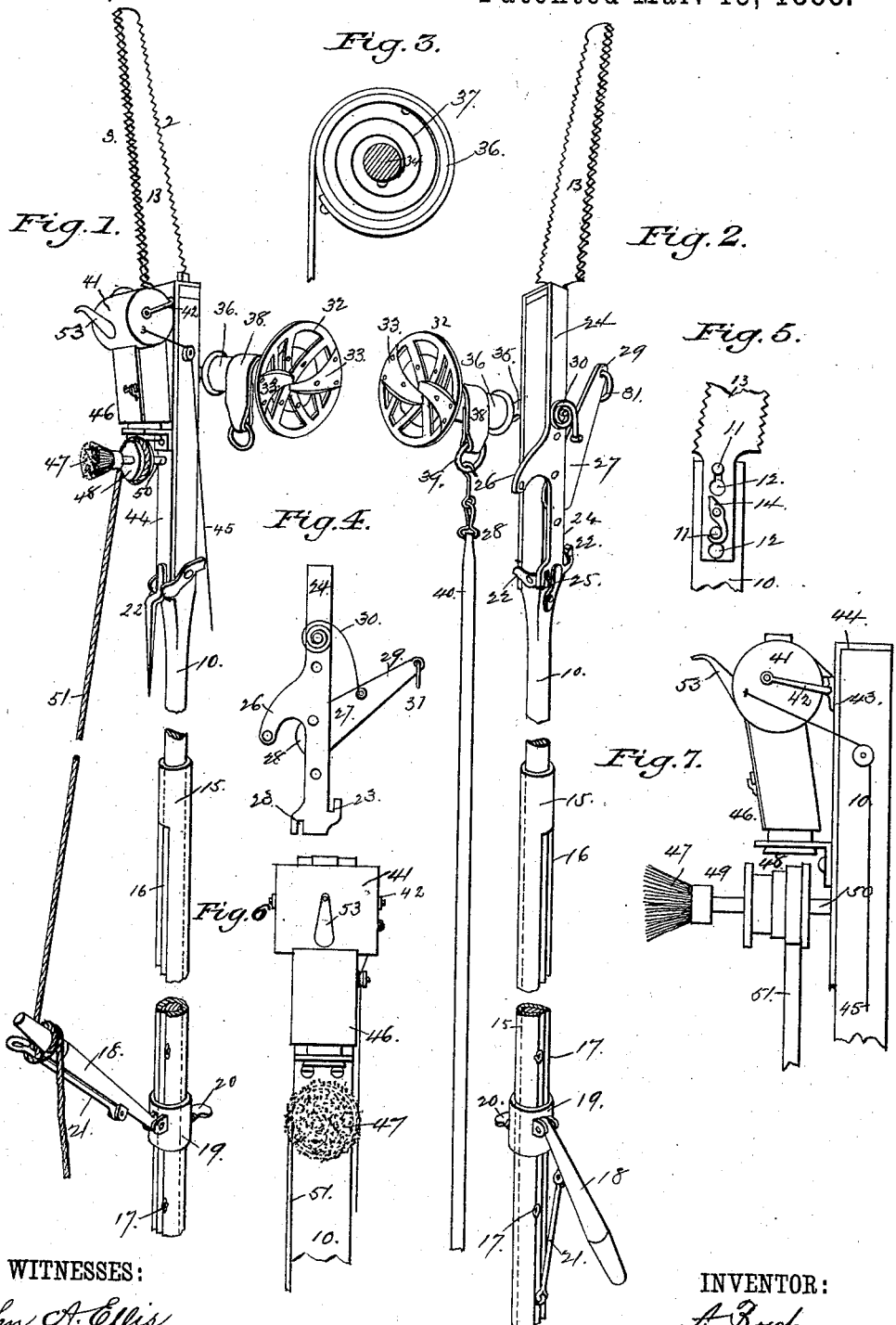
WITNESSES:
John A. Ellis,
C. Sedgwick.
INVENTOR:
A. Bosch
BY Munn & Co.
ATTORNEYS.

UNITED STATES PATENT OFFICE.

ANDREAS BOSCH, OF PRAIRIE DU CHIEN, WISCONSIN.

PRUNING IMPLEMENT.

SPECIFICATION forming part of Letters Patent No. 379,359, dated March 13, 1888.

Application filed August 16, 1887. Serial No. 247,128. (No model.)

*To all whom it may concern:*

Be it known that I, ANDREAS BOSCH, of Prairie du Chien, in the county of Crawford and State of Wisconsin, have invented a new and Improved Combination Pruning Implement, of which the following is a full, clear, and exact description.

This invention relates to the construction of an implement which is applicable for use in the pruning of trees and in the dressing of the wounds caused by such pruning, the implement being so arranged that it will act in connection with large and small limbs, and being also so arranged that it may be used upon trees of almost any height.

Reference is to be had to the accompanying drawings, forming a part of this specification, in which similar figures of reference indicate corresponding parts in all the views.

Figure 1 is a perspective view of my improved pruning implement, the wax-receptacle being represented as it appears when turned down to deliver the wax to the brush. Fig. 2 is a perspective view of the opposite side of the implement. Fig. 3 is a detail view illustrating the construction of one of the spring-drums. Fig. 4 is a detail view of the cutter employed to sever small limbs. Fig. 5 is a detail view illustrating the connection of the saw. Fig. 6 is a detail view illustrating the construction of the waxing attachment, the front of such attachment being shown in the view; and Fig. 7 is a side view of the waxing attachment, other parts carried by the pole not being shown.

In constructing such an implement as the one illustrated in the drawings above referred to, I provide a main supporting pole or shaft, 10, the upper end of which carries two studs or buttons, 11, that are arranged to enter key-hole slots 12, that are formed in the shank of a double-edged saw, 13, said shank being provided with a catch, 14, which may be brought into engagement with one of the buttons 11 after the parts have been adjusted, as represented in Fig. 5. About the pole 10 there is a long metallic sleeve, 15, which is formed with a slot, 16, through which there pass eyes 17, that are carried at intervals by the pole 10.

A lever-arm, 18, is pivotally connected to a sleeve, 19, which sleeve 19 is held to the sleeve 15 by a set-screw, 20. The sleeve 19 is provided with a connecting-link, 21, which may be brought into engagement with any one of the eyes 17, the particular eye with which the link is brought into engagement depending upon the height of the limb that is to be operated upon.

The saw 13 is set at an angle, the arrangement being such that in cutting a limb the under side of the limb may be first operated upon by the side 2 of the saw 13, and a cut having been formed upon the under side, the limb may be finally severed from its connection with the trunk by bringing the other side, 3, of the saw 13 into a position to operate upon the upper side of the limb, the saw being reciprocated by the lever 18, said lever being connected to the pole 10 by the link 21, and the sleeve 15 being firmly held. Then, if a pumping or reciprocating motion be imparted to the lever, the pole, and with it the saw, will be correspondingly reciprocated.

To two opposite faces of the upper portion of the pole 10, which upper portion is square, I connect catches 22, that are arranged to engage notches 23, formed in a frame, 24, that is shaped to overlap the upper end of the pole 10, the parts being adjusted as represented in Fig. 2; and, in order that the attachment may be more secure, I might employ a third catch, 25.

The frame 24 is formed with a hooked arm, 26, and to the frame there is pivotally connected a cutting-blade, 27, formed with a rounded edge, 28, and with an upwardly-extending arm, 29, the arm 29 being connected to the frame 24 by a coil-spring, 30.

In operating this cutter, which works as a pair of shears, a strap or cord is attached to the arm 29, said arm being preferably provided with a ring, 31, to which the strap is directly connected, and the strap is connected to the lever 18, said lever being disconnected from the pole. Then by forcing down the lever the cutting-edge of the blade 27 will be carried toward the arm 26, and any small limb caught within the arm will be severed, the blade 27 being returned to the position in which it is shown in Fig. 2 by the action of the spring 30 when the pressure upon the lever 18 is relaxed.

In order that the wounds caused by pruning or cutting the limbs may be dressed and made smooth, I provide a disk, 32, which is provided with two cutting-blades, 33, and this disk is connected to a drum, 36, that is loosely mounted upon a shaft, 34, said shaft being connected to the frame 24 by a bracket, 35. A spring, 37, is connected to the shaft 34 and to the drum 36, and to the outer face of the drum there is connected a strap, 38, which is provided with a ring, 39, by which connection with a downwardly-extending strap, 40, is established.

In operation the strap 40 is connected to the lever 18, and then the lever is moved downward, which movement of the lever will advance the disk 32, and if the blades 33 are at this time held against the stump to be dressed all uneven projections will be cut or planed off, the disk moving in an opposite direction when the pressure upon the lever 18 is relaxed, and the spring 37 is allowed to act to return the drum to its normal position.

In order that the wounds caused by the pruning may be dressed with wax, I mount a wax reservoir or vessel, 41, upon a bracket, 42, said bracket being carried by a frame, 44, that is arranged to be secured to the pole 10. The vessel 41 is eccentrically connected to the bracket 42, so that it normally rests in the position in which it is shown in the drawings; but to this vessel I connect a downwardly-extending strap or cord, 45, which leads downward to within reach of the operator, passing over a sheave that is secured to the upper end of the pole 10, as shown in Fig. 1, the arrangement being such that by drawing down upon the cord 45 the vessel 41 may be turned upon its connection with the bracket 42. Beneath the wax-receptacle 41, I mount a lamp, 46, and beneath the lamp there is a brush, 47, that is connected to a drum, 48, by a shaft, 49, the drum being mounted to turn upon a stud, 50, and being provided with a spring, as in the case of the drum 36, while a strap, 51, leads downward to the operator from the drum 48. The vessel 41 has a spout, 53.

From the construction described it will be seen that by drawing down upon the strap 45 the wax-vessel 41 may be tilted to a position to deliver wax to the brush 47, which brush is operated by its strap or cord 51, a rotary reciprocating motion being imparted to the brush by alternately drawing down and relaxing the power brought to bear upon the strap or cord.

With the implement above described I am able to prune trees irrespective of their heights, and dress the wounds caused by pruning or trimming them, so that all danger of bleeding is avoided.

Having thus fully described my invention, I claim as new and desire to secure by Letters Patent—

1. The combination, with a pole carrying a saw at its upper end, of a sleeve surrounding the pole, a pivoted lever connected to the said sleeve, and a link pivoted to the said lever and pole, substantially as described.

2. The combination, with a double-edged saw formed with an apertured shank, of a pole provided with buttons which pass through the apertures of the saw-shank, a catch arranged to engage with the buttons, a sleeve surrounding the pole, and a lever pivotally connected to the sleeve and arranged for connection with the pole, substantially as described.

3. The combination, with a saw, of a pole to which the saw is connected, a sleeve surrounding the pole and formed with a longitudinal slot, a lever pivotally connected to the sleeve, a link connected to the lever, and eyes carried by the pole, with which the link may be engaged, substantially as described.

4. The combination, with a pole, of the cutter-carrying frame 24, provided with the notches 23 at its lower end, and the catches 22, for engaging the notches and locking the frame to the pole, substantially as herein shown and described.

5. The combination, with a pole, of the frame 24, provided with the notches 23 and with the downwardly-projecting and hooked arm 26, the catches 22, for locking the frame to the pole, and the pivoted and spring-actuated cutting-blade 27, substantially as herein shown and described.

6. The combination, with a wax-receptacle provided with a spout, of a lamp mounted beneath the receptacle, a brush mounted beneath the lamp, a means for reversing the position of the wax-receptacle, and a means for imparting a rotary reciprocating motion to the brush, substantially as described.

7. In a pruning implement, the combination, with a pole, of a disk provided with cutting-blades on one of its faces, and pivoted on the upper end of said pole, and means for operating said disk, substantially as herein shown and described.

8. In a pruning implement, the combination, with a pole, of a spring-drum on the upper end of the pole, a cutting-disk carried by the drum, and a strap or cord attached to the drum, substantially as herein shown and described.

9. In a pruning implement, the combination, with a pole, of a can provided with a spout and eccentrically pivoted to a support at the upper end of the pole, and means for reversing the position of the can, substantially as described.

10. In a pruning implement, the combination, with a pole, of a can provided with a spout and eccentrically pivoted to a support on the pole, a cord or strap for reversing the position of the can, and a lamp below the can, substantially as herein shown and described.

11. In a pruning implement, the combination, with a pole provided with buttons, of a saw-blade having its shank provided with key-hole slots and a catch for engaging one of the buttons, substantially as described.

12. As an improved article of manufacture, a pruning implement comprising a saw, a cutting-blade, rotary cutting-blades, and a waxing apparatus, all mounted on a pole or rod, as set forth.

ANDREAS BOSCH.

Witnesses:
C. S. FULLER,
OTTO GEORGII.